No. 892,122. PATENTED JUNE 30, 1908.
J. H. BLEOO.
FLUID PRESSURE BRAKE MECHANISM.
APPLICATION FILED JUNE 13, 1907.

Witnesses:
Inventor
John H. Bleoo.
By his Attorney
T. F. Bowne

UNITED STATES PATENT OFFICE.

JOHN H. BLEOO, OF NEW YORK, N. Y., ASSIGNOR TO ABRAHAM B. LEVY, OF NEW YORK, N. Y.

FLUID-PRESSURE BRAKE-MECHANISM.

No. 892,122.  Specification of Letters Patent.  Patented June 30, 1908.

Application filed June 13, 1907. Serial No. 378,686.

*To all whom it may concern:*

Be it known that I, JOHN H. BLEOO, a citizen of the United States, and resident of New York city, borough of Brooklyn, State of New York, have invented certain new and useful Improvements in Fluid-Pressure Brake Mechanism, of which the following is a specification.

The object of my invention is to permit recharging of a fluid pressure or air brake system during the time that the brakes are applied or set irrespective of the positions of the slide-valves and pistons of the triple valves, or in other words, to permit recharging of the system while holding the brakes applied whether or not the triple valve parts remain in service position, or have moved to full release position or to any other position, and at such time to permit release of the brakes irrespective of whatever pressure may be in the train pipe and auxiliary reservoirs.

In carrying out my invention I provide in connection with the engineer's valve, triple valves, brake cylinders, and other parts of an air brake system, such, for instance, as the Westinghouse or New York system, means to prevent discharge of air from the brake cylinders while the brakes are applied or set and to permit at such time recharging of the auxiliary reservoirs, to a suitable pressure such as a pressure lower than the pressure supplied in the "running" position of the engineer's or controlling valve handle, the engineer's valve having means for recharging the system to a pressure lower than that permitted by the usual 70 lb. reducing valve, whereby if one or more of the triple valve pistons and slide valves move to full release position during recharging the brakes will remain applied, and whereby when the engineer's valve handle is moved to full release position said means that hold the brakes applied will be moved to release position, notwithstanding the pressure that may be in the train pipe and auxiliary reservoirs, to thereby permit the escape of air from the brake cylinders and release the brakes.

In the specific embodiment of my invention illustrated in the accompanying drawings I provide a valve having chambers, passages and ports, with a piston and a valve, (shown in the form of a slide-valve) to control said ports and passages, and which chambers and passages are connected with the train pipe, the triple valve exhaust for the brake cylinder air, and the auxiliary reservoir associated therewith, said valve also having means to permit recharging of the associated auxiliary reservoir, arranged in such manner that upon reduction of train pipe pressure said piston and valve will be moved by auxiliary air pressure to shut off the exhaust from the associate brake cylinder and will remain in such position while recharging of the system is taking place and until sudden increased or full release pressure is thrown into the system by the engineer to cause such piston and valve to move back to release position to open the brake cylinder exhaust to atmosphere, all without reference to the position of the associated triple valve parts or the pressure within the system.

The invention also comprises the novel details of improvement and combinations of parts that will be more fully hereinafter set forth and then pointed out in the claims.

Reference is to be had to the accompanying drawings forming part hereof, wherein.

Similar numerals of reference indicate corresponding parts in the several views.

The numeral 1 indicates, generally, an engineer's or controlling valve; 2 a main reservoir, and 3 an equalizing reservoir connected by pipes 2ª, 3ª with valve 1 in usual manner; 4 a usual pressure reducing valve for the "running" position; 5 a train pipe; 6 a triple valve connected with brake cylinder 7, and 8 an auxiliary reservoir connected with the triple valve, all of which parts and their necessary adjuncts and connections may be constructed and arranged in manner usual in air brake systems, as for instance in the well-known Westinghouse and New York air brake systems. While I have shown but one triple valve, brake cylinder, and auxiliary reservoir, it will be understood that any number of the same may be included in the system in accordance with the requirements of a train, and that the same may operate in usual manner in such systems.

My improved valve adapted for holding the brakes applied while permitting recharging of the associate auxiliary reservoir, as illustrated in the accompanying drawings, is arranged as follows: a suitable casing 10 shown provided with a cap 11, (which may be held on casing 10 by screw threads) is provided with a chamber or space 12 placed in communication with auxiliary air, as by pipe 13 connected with inlet 12ª and shown connected at 14 (Fig. 1) with the auxiliary air space of the brake cylinder head 7ª to which is attached the triple valve, although said chamber may be connected with auxiliary air in any other suitable manner. Casing 10 also has a chamber 15 containing a suitable piston 16, which chamber is connected with train pipe 5, as by pipe 15ª connected with passage 17. The stem 16ª of piston 16 passes within a chamber 18 in casing 10, shown formed within a sleeve 19 within said casing. Said chamber 18, or its sleeve 19, has a suitable valve-seat 19ª communicating by port 20 with a suitable passage 21 in casing 10, which passage communicates, as by pipe 22, with the brake cylinder exhaust port 23 of triple valve 6. Port 20 is controlled by a valve, shown in the form of a slide valve 24 mounted upon seat 19ª and provided on its under surface with a cavity 24ª to communicate with port 20 and with an exhaust passage 25 in casing 10, as through a port 26 in sleeve 19, for placing the brake cylinder exhaust in communication with the atmosphere in the position of the parts shown in Fig. 7, which is the full release position of my improved valve. Slide valve 24 is operated by piston 16 by means of the shoulders 16ᵇ, 16ᶜ of stem 16ª. A spring 27 connected with slide valve 24, as by a pin 28, and bearing against sleeve 19 serves to maintain valve 24 upon its seat.

At 29 I have shown a relatively light spring coiled around stem 16ª and bearing against shoulder or projection 16ᶜ and against an adjustable stop or plug 30 screwed into a hole in casing 10, whereby the tension of said spring may be regulated. The purpose of spring 29 is to assist in moving piston 16 and slide valve 24 to the left in Fig. 7 upon a service or emergency application or reduction of air pressure, but said spring is not intended to be of such strength as to overcome the air load on valve 24 and the friction of the moving parts, and yet said spring will tend to resist return movement of piston 16 and valve 24 during recharging, while permitting ready movement of said parts upon sudden increase of pressure in the train line, as during full release pressure in the system. Upon service application or reduction of train pipe pressure, auxiliary air pressure will cause piston 16 and valve 24 to move to the left in Fig. 7, owing to the preponderance of auxiliary air pressure in chambers 12 and 18 above train line pressure in chamber 15, to cause slide valve 24 to lap port 20 and prevent the escape of brake cylinder air to atmosphere while the brakes are applied and during recharging of the system, valve 24 remaining in such position until full release pressure, or a sudden pressure higher than recharging pressure, in the system, such position being shown in Fig. 6.

To permit recharging the auxiliary reservoir and maintain equalizing pressures in chambers 15, 18 and 12 during recharging, I have shown means to permit recharging from the train pipe directly into chamber 18 and thence to the associate auxiliary reservoir, as follows: a passage 31 in piston 16 opens through the train pipe side of said piston in communication with chamber 15, and one or more passages 32 in said piston extend from passage 31 into communication with chamber 18, a plug 32ª being shown screwed into the enlarged part 31ª of chamber 31.

Figures 7, 8, 9, 10, 11, 12:
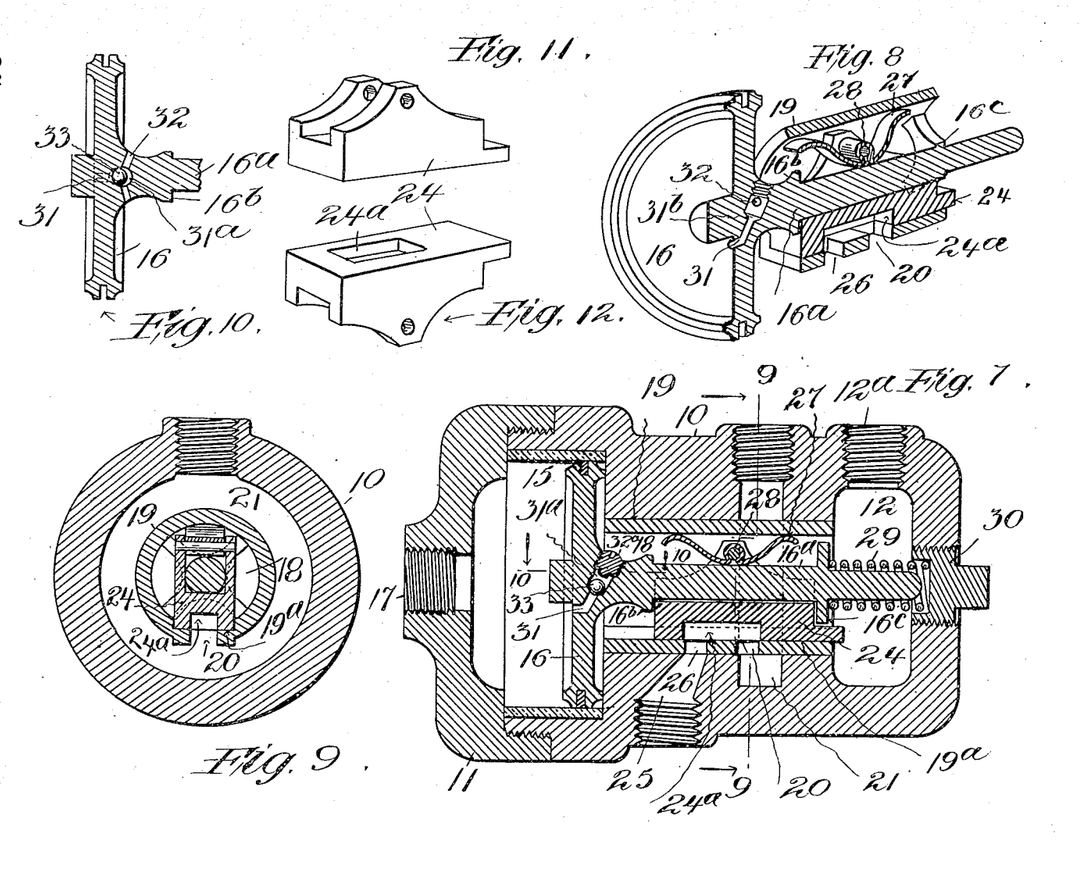
Fig. 7 is an enlarged central sectional view of my improved recharging brake holding valve shown in "full release" position.
Fig. 8 is a sectional perspective view of part thereof.
Fig. 9 is a cross section on the line 9, 9 in Fig. 7, looking in the direction of the arrows.
Fig. 10 is a central section on the line 10, 10 on Fig. 7, showing the recharging ports and valve of the piston.
Fig. 11 is a perspective view of the slide valve of my improved recharging brake-holding valve.
Fig. 12 is an inverted view thereof.

At 33 is a valve, shown in the form of a ball, adapted to fit the seat 31ᵇ of passage 31, to prevent reduction of air pressure in chamber 18 through passage 31 into chamber 15 when train pipe pressure is reduced, and yet to lift when recharging air from the train pipe enters chamber 15 to permit such air to pass thence to the auxiliary reservoir 8. When full release pressure is thrown into the train pipe the passage 31 and valve 33 will not prevent such pressure from restoring piston 16 and slide valve 24 to full release position, as shown in Fig. 7.

Figures 2, 3, 5:
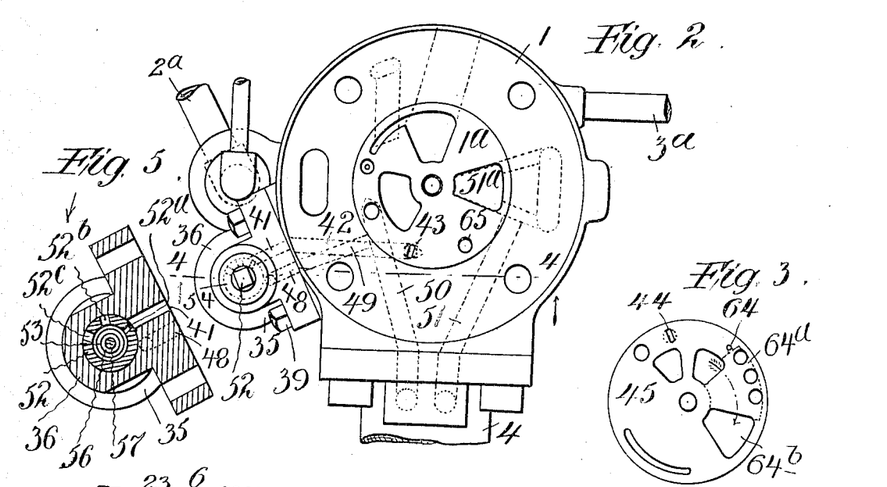
Fig. 2 is a plan view of an engineer's valve, the cap being removed, showing the pressure-reducing valve connected therewith for use in recharging the system.
Fig. 3 is an inverted plan view of the engineer's valve-disk.
Fig. 5 is a sectional view through the recharging valve on the line 5 in Fig. 4.

I have shown means connected with the engineer's or controlling valve 1 to permit recharging of the system at a suitable pressure below the pressure permitted through reducing feed valve 4 operating in the usual "running" position. Said valve, which for convenience I term 60 lb. reducing valve, is shown, generally, at 35 applied to engineer's valve 1. The reducing valve 35 may, generally, be of the construction shown in my Patent No. 841,924, granted Jan. 22, 1907, and is shown arranged to permit the desired reduced pressure to pass to the train line while also permitting the control of the volume of such air as required. As shown, said valve 35 comprises members 36, 37, 38 attached together by screw threads, the member 36 being shown attached by screws 39 to a suitable face on the side of valve 1, and said member is shown provided with a chamber 40 from which a passage 41 leads to passage 42 in the metal of valve 1, the passage 42 having port 43 opening through valve seat 1ª of valve 1 for co-action with a passage and port 44 leading through rotary valve disk 45, connected with the engineer's handle 46 in usual manner. Casing 36 also has a chamber 47 from which a passage 48 leads to a passage 49 in the metal of valve 1 for conducting reduced air pressure to the train line, for this purpose passage 49 being shown connected with the usual passage 50 of the controlling valve that communicates with the usual reducing valve 4. The air passes thence through the usual passages 51, 51ª to the train pipe in well known manner without retardation by valve 4. Within chamber 40 is journaled a plug or cock 52 which has a bore 53 and whose walls are shown provided with a plurality of ports 52ª, 52ᵇ, 52ᶜ, (Fig. 5) to admit fluid from passage 42 through passage 41 into bore 53 in accordance with the volume desired to be transmitted to the train pipe, according to the position of adjustment of plug 52, and said plug or cock 52 may be turned to prevent any flow of air from valve 35 when required.

Figures 4, 6:
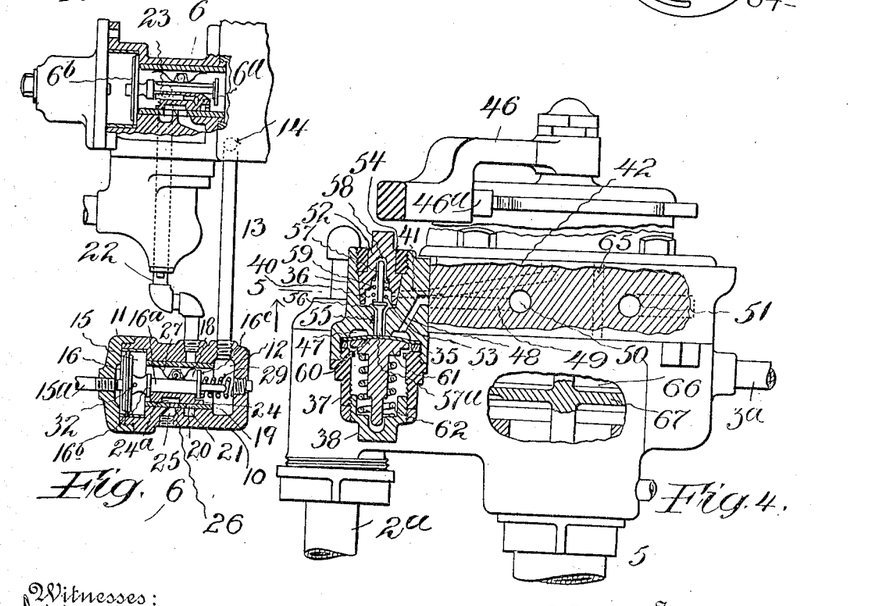
Fig. 4 is a side view of Fig. 2 partly in section on the line 4, 4, in Fig. 2.
Fig. 6 is a partly sectional side elevation showing the triple valve and my improved recharging brake-holding valve associated therewith, the last named valve being shown in the "service" or "emergency" position, while the brakes are held applied or set, and the triple valve slide-valve in full release position.

I have shown plug 52 rotatively retained in chamber 40 by a nut 54, and said plug may be operated by a suitable handle connected therewith. The passage 55 from chamber 40 is controlled by a valve 56 shown having its upper stem 57 guided in a bore 58, a spring 59 serving normally to push said valve to its seat. The stem 57ª of valve 56 passes through passage 55 and bears upon a diaphram 60 located at one side of chamber 47 and shown clamped at its edge between members 36 and 37, and at 61 is a spring-pressed plunger bearing against said diaphram and controlled by the spring 62 shown bearing against member 38, whereby the tension of said spring may be adjusted. Spring 62 tends normally to raise valve 56 from its seat as shown in Fig. 4. Spring 62 may be set to permit any desired air pressure, say 60 lbs., to flow through valve 35 to the train pipe for recharging the system, and plug 52 may be rotated and left in such position as required to permit the desired volume of air to pass through its port 52ª, 52ᵇ, or 52ᶜ.

Figure 1:
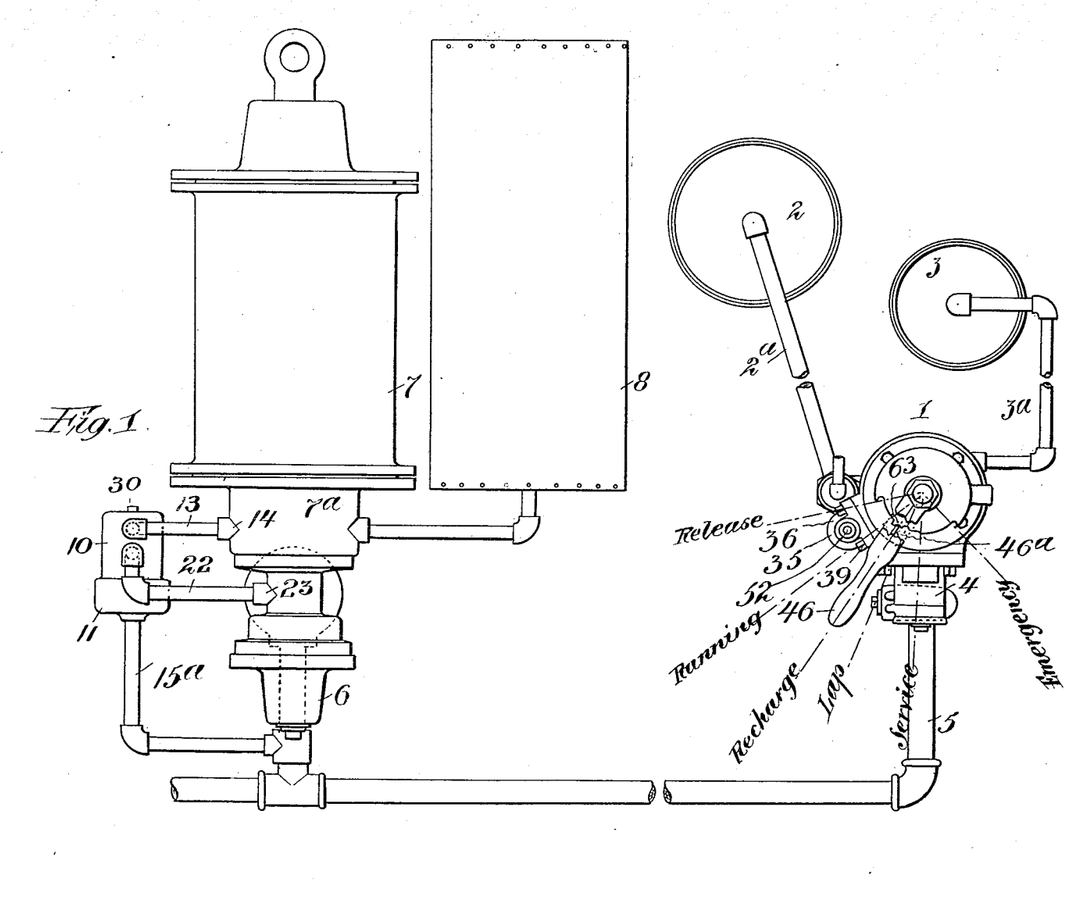
Figure 1 is a diagrammatic plan view of an air brake system embodying my invention.

The position of passage 44 in valve 45 will be such that when they register all other ports and passages controlled by valve 45 will be blanked, which is what I term the recharging position of valve 45 and handle 46, and, to hold the valve in such position I have shown a notch 63 in addition to the usual notches to receive the dog 46ª of handle 46 for holding said handle set in the recharging position, (Fig. 1).

In addition to recharging the train pipe and auxiliary reservoirs while the brakes remain applied, I preferably provide means for recharging the equalizing reservoir 3 and for this purpose I provide the engineer's valve 45 with a port 64 communicating with the usual cavity 64ª and adapted to register with the port 65 that leads to the usual chamber 66 above the equalizing piston 67 of valve 1, when ports 43 and 44 register, air from 51, 51ª, passing from opening 64ᵇ (registering with 51ª) through cavity 64ª and port 64, through port 65 to chamber 66, so as to maintain substantial equilibrium of pressure upon opposite sides of the equalizing piston of the engineer's valve during recharging of the system.

With an air brake system equipped with my improvement in the manner set forth, and the engineer's handle 46 moved to "service" position, the reduction of train pipe pressure thereby effected in usual manner will cause the triple valve or valves of the system to move to "service" position for application of the brakes as customary, and thereupon the reduction of pressure in chamber 15 of my recharging brake-holding valve to the train line, will, by reason of the preponderating air pressure in chambers 18 and 12 from the associate auxiliary reservoir, cause piston 16 and slide valve 24 to move from the normal position in Fig. 7 to the brake-holding position in Fig. 6, whereupon valve 24 will close port 20 while at the same time the slide valve 6ª of the triple valve 6 will, as usual, close the brake cylinder exhaust 23. Then handle 46 may be moved to "lap" position in usual manner, and to recharge the system handle 46 will be moved to the recharging position shown in Fig. 1, whereupon port 44 will register with port 43 and air from the main reservoir will pass through passages 42 and 41, through reducing valve 35 (plug 52 being set to the desired position for the volume of air required for the train line) and such air will thence flow under reduced pressure, say 60 lbs., through passages 48 and 49 to passage 50, thence through valve 4 (without obstruction) to passage 51, 51ª to the train line for recharging the same. Such recharging air will flow through passage 31 into chambers 18 and 12 and thence to the auxiliary reservoir. Such increased pressure acting upon pistons 6ᵇ of the triple valves of the system may cause more or less of them to move to full release position, but such increased recharging air pressure will not cause piston 16 and slide valve 24 to move from the position shown in Fig. 6 to uncover port 20, but said piston and slide valve will remain in the brake-holding position shown in Fig. 6 while the triple valve may be in full release position as shown in said figure.

The reason that piston 16 and its valve 24 remain in the brake-holding position is because the increasing recharging air in the system passes through passage 31 of piston 16 into chamber 18 and thence to the associate auxiliary reservoir maintaining a substantial equilibrium of pressure upon opposite sides of piston 16 during recharging, and further by reason of the air load on valve 24, the friction of the parts, and the light resistance of spring 29. When the triple valve piston $6^b$ reaches full release position recharging of the auxiliary reservoir may further progress through the usual leakage grooves at said tripple valve piston, further maintaining equal pressure upon opposite sides of piston 16. As the triple valve parts are thus permitted to pass to full release position during recharging of the system while the brake cylinder air is kept from exhausting to atmosphere by slide valve 24, it is practically immaterial in what position the triple valve slide valves of the system may be during recharging. When the engineer's handle 46 is next moved to full release position the increased pressure thrown into the system will be sufficient to overcome the resistance of the air in chambers 18 and 12 of my recharging valves, and thus will push the pistons 16 and their slide valves 24 to full release position (Fig. 7) causing cavity $24^a$ to place brake cylinder exhaust port 20 into communication with the atmosphere through exhaust 25 to release the brakes. By recharging the system through reducing valve 35 to say, 60 lbs. pressure, or below the pressure of the "running" position, the full release pressure will always be sufficiently high to cause operation of pistons 16 and their valves 24 for releasing the brakes. By maintaining handle 46 in the recharging position while the brakes are applied the air leaks in the system can be kept from reducing train line pressure, thus preventing "leaking on" of the brakes, and the auxiliary reservoirs may be kept supplied with sufficient air to permit further application of the brakes if desired, as the auxiliary reservoirs may thus be maintained with pressure above the brake cylinder pressure while the brakes are applied. In the "running" position piston 16 and valve 24 will be maintained in full release position, the same as the triple valves are maintained, to insure release of the brakes while charging of the train line as usual is being effected.

My improvements in nowise affect the usual and customary operation of the brakes or the system, but provide improved means for permitting the recharging of the system while the brakes are applied without regard to the position of the piston and slide valve, or other parts, of any triple valve of the system, so that with a train equipped with my improvements in its air brake system, recharging of the system may be effected without danger of releasing any brake by reason of movement of the parts of the triple valve.

Having now described my invention what I claim is:

1. In a fluid-pressure brake mechanism, the combination of the necessary operating parts thereof, with a brake holding device communicating with the train pipe, the auxiliary reservoir, and the brake cylinder exhaust, and provided with means operative by preponderating auxiliary air pressure to close the brake cylinder exhaust to atmosphere upon reduction of train pipe pressure and to open said brake cylinder exhaust upon a sudden increase of train pipe pressure acting upon said means and means to prevent reduction of auxiliary air pressure to the train pipe through said device upon reduction of train pipe pressure.

2. In a fluid pressure brake mechanism, the combination of the necessary operating parts thereof, with a recharging brake-holding device communicating with the train pipe, the auxiliary reservoir, and the brake cylinder exhaust, and provided with means operative by preponderating auxiliary air pressure to close the brake cylinder exhaust to atmosphere upon reduction of train pipe pressure and to open said brake cylinder exhaust upon a sudden increase of train pipe pressure acting upon said means, and having means to permit recharging of the auxiliary reservoir through said brake-holding valve device.

3. In a fluid-pressure brake mechanism the combination of the necessary operating parts thereof, with a recharging brake holding device communicating with the train pipe, the auxiliary reservoir, and the brake cylinder exhaust, and provided with means operative by preponderating auxiliary air pressure to close the brake cylinder exhaust to atmosphere upon reduction of train pipe pressure and to open said brake cylinder exhaust upon a sudden increase of train pipe pressure acting upon said means, and having means to permit recharging of the auxiliary reservoir through said brake holding valve device, and arranged to prevent reduction of the auxiliary air pressure to the train pipe through said means upon reduction of train pipe pressure.

4. In a fluid-pressure brake, the combination of a train pipe, a triple valve, a brake cylinder, and an auxiliary reservoir, with a recharging valve having a chamber connected with the train pipe, a chamber in communication with the auxiliary reservoir, a chamber communicating with the brake cylinder exhaust of the triple valve, and also having means for controlling said brake cylinder exhaust arranged to operate by preponderating auxiliary air pressure upon reduction of train pipe pressure, and provided with means to permit recharging of the auxiliary reservoir from the train pipe through the second named chamber.

5. In a fluid-pressure brake, the combination of a train pipe, a triple valve, a brake cylinder, and an auxiliary reservoir, with a recharging valve having a chamber connected with the train pipe, a chamber in communication with the auxiliary reservoir, a chamber communicating with the brake cylinder exhaust of the triple valve, and also having means for controlling said brake cylinder exhaust arranged to operate by preponderating auxiliary air pressure upon reduction of train pipe pressure, and provided with means to permit recharging of the auxiliary reservoir from the train pipe through the second named chamber, and an engineer's valve connected with the train pipe and provided with means to deliver air to the train pipe at a pressure below the pressure supplied in the running position.

6. In a fluid-pressure brake the combination of a train pipe, a triple valve, a brake cylinder, and an auxiliary reservoir, with a recharging valve having a chamber connected with the train pipe, a chamber in communication with the auxiliary reservoir, a chamber communicating with the brake cylinder exhaust of the triple valve, and also having means for controlling said brake cylinder exhaust arranged to operate by preponderating auxiliary air pressure upon reduction of train pipe pressure and provided with means to permit recharging of the auxiliary reservoir from the train pipe through the second named chamber, said recharging means being arranged to prevent the passage of auxiliary air to the train pipe upon reduction of train pipe pressure.

7. In a fluid-pressure brake, the combination of a train pipe, a triple valve, a brake cylinder, an auxiliary reservoir, and an engineer's valve, with a recharging brake-holding valve device communicating with the train pipe, the auxiliary reservoir, and the brake cylinder exhaust, and provided with means operative by preponderating auxiliary air pressure upon reduction of train pipe pressure to cause the closing of the brake cylinder exhaust and to permit recharging of the auxiliary reservoir through said valve device while said brake cylinder exhaust remains closed irrespective of the position of the triple valve parts, said engineer's valve being provided with means for recharging the system to a pressure lower than the pressure supplied in the running position of the engineer's valve.

8. In a fluid-pressure brake, the combination of a train pipe, a triple valve, a brake cylinder, an auxiliary reservoir, and an engineer's valve, with a recharging brake-holding valve device communicating with the train pipe, the auxiliary reservoir, and the brake cylinder exhaust, and provided with means operative by preponderating auxiliary air pressure upon reduction of train pipe pressure to cause the closing of the brake cylinder exhaust and to permit recharging of the auxiliary reservoir through said valve device while said brake cylinder exhaust remains closed irrespective of the position of the triple valve parts, said engineer's valve being provided with means for recharging the system to a pressure lower than the pressure supplied in the running position of the engineer's valve, said recharging means of said valve device being arranged to prevent reduction of auxiliary air pressure to the train pipe upon reduction of train pipe pressure.

9. In a fluid-pressure brake, the combination of the necessary operating parts thereof, with a brake-holding device communicating with the train pipe, the auxiliary reservoir, and the brake cylinder exhaust of the triple valve, and comprising a valve to control the brake cylinder exhaust, a movable member operated by the difference between train pipe and auxiliary air pressure arranged to cause said valve to close the brake cylinder exhaust to atmosphere by preponderating auxiliary air pressure upon reduction of train pipe pressure, and to open the brake cylinder exhaust to atmosphere upon a sudden increase of train pipe pressure above auxiliary air pressure and means to prevent reduction of auxiliary air pressure to the train pipe through said device upon reduction of train pipe pressure.

10. In a fluid-pressure brake, the combination of the necessary operating parts thereof, with a recharging brake holding device communicating with the train pipe, the auxiliary reservoir, and the brake cylinder exhaust of the triple valve, and comprising a valve to control the brake cylinder exhaust, a movable member operated by the difference between train pipe and auxiliary air pressure arranged to cause said valve to close the brake cylinder exhaust to atmosphere by preponderating auxiliary air pressure upon reduction of train pipe pressure, and to open the brake cylinder exhaust to atmosphere upon a sudden increase of train pipe pressure above auxiliary air pressure, and means to permit recharging of the auxiliary reservoir through said device during the time that the brake cylinder exhaust is closed by said valve.

11. In a fluid pressure brake, the combination of the necessary operating parts thereof, with a recharging brake-holding device communicating with the train pipe, the auxiliary reservoir, and the brake cylinder exhaust of the triple valve, and comprising a valve to control the brake cylinder exhaust, a movable member operated by the difference between train pipe and auxiliary air pressure arranged to cause said valve to close the brake cylinder exhaust to atmosphere by preponderating auxiliary air pressure upon reduction of train pipe pressure, and to open the brake cylinder exhaust to atmosphere upon a sudden increase of train pipe pressure above auxiliary air pressure, and means to permit recharging of the auxiliary reservoir through said device during the time that the brake cylinder exhaust is closed by said valve, and arranged to prevent reduction of auxiliary air pressure to the train pipe through said device upon reduction of train pipe pressure.

12. In a fluid-pressure brake, the combination of a train pipe, an engineer's valve provided with means for recharging the system at a pressure below the pressure of the running position, a triple valve, an auxiliary reservoir, and a brake cylinder, with a brake-holding valve device having a chamber communicating with the train pipe, a chamber communicating with the auxiliary air, and a chamber communicating with the brake cylinder exhaust of the triple valve, and having a valve to control the brake cylinder exhaust and a movable member connected with said valve arranged to move said valve to close the brake cylinder exhaust by preponderating auxiliary air pressure upon reduction of train pipe pressure and means to prevent reduction of auxiliary air pressure to the train pipe through said device upon reduction of train pipe pressure.

13. In a fluid pressure brake, the combination of a train pipe, an engineer's valve provided with means for recharging the system at a pressure below the pressure of the running position, a triple valve, an auxiliary reservoir, and a brake cylinder, with a recharging brake holding valve device having a chamber communicating with the train pipe, a chamber communicating with auxiliary air, and a chamber communicating with the brake cylinder exhaust of the triple valve, and having a valve to control the brake cylinder exhaust and a movable member connected with said valve arranged to move said valve to close the brake cylinder exhaust by preponderating auxiliary air pressure upon reduction of train pipe pressure, and having means to permit recharging of the auxiliary reservoir through the said chamber communicating therewith and to prevent reduction of auxiliary air pressure to the train pipe therethrough.

14. In a fluid-pressure brake, the combination of a train pipe, an engineer's valve provided with means for recharging the system at a pressure below the pressure of the running position, a triple valve, an auxiliary reservoir, and a brake cylinder, with a brake holding valve device having a chamber communicating with the train pipe, a chamber communicating with the auxiliary air, and a chamber communicating with the brake cylinder exhaust, and having a valve to control said brake cylinder exhaust, a movable member connected with said valve, and a relatively light spring to co-act with said valve and movable member and of such strength as not to move said member and valve against the resistance of the air load on and friction of the parts, but arranged to assist the movement of said valve and member upon reduction of train pipe pressure.

15. In a fluid pressure brake, the combination of a train pipe, an engineer's valve provided with means for recharging the system at a pressure below the pressure of the running position, a triple valve, an auxiliary reservoir, and a brake cylinder, with a recharging brake holding valve device having a chamber communicating with the train pipe, a chamber communicating with auxiliary air, and a chamber communicating with the brake cylinder exhaust and provided with an exhaust port, a valve to control said port, and a movable member connected with said valve and influenced on opposite sides respectively by train pipe and auxiliary air pressure, arranged to move said valve to close said port by preponderating auxiliary air pressure upon reduction of train pipe pressure and to move back to open said port upon sudden increase of train pipe pressure acting upon said member, said member being provided with a passage communicating with said train pipe chamber and with said auxiliary air chamber, and a valve controlling said passage to permit the flow of air from the train pipe through said passage to the auxiliary reservoir and to prevent reduction of auxiliary air through said passage.

16. In a fluid-pressure brake, the combination of a train pipe, an engineer's valve provided with means for recharging the system at a pressure below the pressure of the running position, a triple valve, an auxiliary reservoir, and a brake cylinder, with a recharging brake holding device having a chamber communicating with the train pipe, a chamber communicating with auxiliary air, and a chamber communicating with the brake cylinder exhaust and provided with a port and passage, a slide valve having a cavity to control said port and passage, a piston in the first named chamber connected with said valve, said piston having a passage communicating with the train pipe air and with said auxiliary air chamber, and a valve to control said passage arranged to permit the flow of train pipe air to the auxiliary reservoir and to prevent the flow through said passage of auxiliary air to the train pipe.

17. In a fluid pressure brake, the combination of a train pipe, an engineer's valve, a triple valve, an auxiliary reservoir and a brake cylinder, with a recharging brake holding device having a chamber communicating with the train pipe, a chamber communicating with auxiliary air, and a chamber communicating with the brake cylinder exhaust and provided with a port and passage, a slide valve having a cavity to control said port and passage and under the influence of auxiliary air pressure, a piston in the first named chamber connected with said valve, said piston having a passage communicating with train pipe air and with said auxiliary air chamber, and a valve to control said passage arranged to permit the flow of train pipe air to the auxiliary reservoir and to prevent the flow through said passage of auxiliary air to the train pipe, said engineer's valve being provided with a feed valve for the running position, and with a recharging pressure reducing valve having a port and passage communicating with the train pipe and a recharging port and passage communicating with the valve seat of the engineer's valve, the engineer's rotary valve having a recharging passage to communicate with the last named port while other ports of said seat are closed, said engineer's valve having a notch to hold the engineer's valve handle in recharging position.

18. In a fluid pressure brake the combination of a train pipe, an engineer's valve provided with a feed valve and having passages connecting the same with the valve seat and with the train pipe passage, a rotary valve having a port arranged to supply air to the feed valve passage for the running position, a recharging pressure reducing valve connected by a passage and a recharging port with the valve seat and also connected by a passage with the passage of the feed valve that leads to said seat, the rotary valve having a passage to communicate with said recharging-port while other ports of said seat are closed, a triple valve, a brake cylinder, an auxiliary reservoir, and a recharging brake holding valve device having a chamber connected with the train pipe, a chamber communicating with auxiliary air, and a chamber communicating with the brake cylinder exhaust, and provided with means operative by preponderating auxiliary air pressure upon reduction of train pipe pressure to close the brake cylinder exhaust and arranged to open said exhaust upon sudden increase of train pipe pressure, and means for recharging the auxiliary reservoir through said valve device.

19. In a fluid pressure brake, the combination of a triple valve, a train pipe connected therewith, a brake cylinder, an auxiliary reservoir, and an engineer's valve connected with the train pipe, and provided with means for supplying air to the train pipe while the brakes are applied, with a recharging brake holding valve device communicating with the train pipe, the auxiliary reservoir, and the brake cylinder exhaust, and having means for preventing exhaust of brake cylinder air upon reduction of train pipe pressure, and arranged to maintain said exhaust closed irrespective of the position of the triple valve parts and also provided with means to permit recharging of the auxiliary reservoir while the brake cylinder exhaust is held closed irrespective of the pressure in the train pipe and the auxiliary reservoir below the pressure of the running position or full release.

20. In a fluid pressure brake, the combination of a train pipe, a triple valve, a brake cylinder, an auxiliary reservoir, an engineer's valve provided with a feed valve for the running position and a pressure reducing valve for recharging the system at a pressure below that supplied in the running position, and means controlled by the engineer's rotary valve to direct air to the recharging pressure reducing valve and simultaneously to admit recharging air to the chamber above the equalizing piston, with a brake holding device communicating with the train pipe, the auxiliary reservoir, and the brake cylinder exhaust, and provided with means operative by preponderating auxiliary air pressure to close the brake cylinder exhaust to atmosphere upon reduction of train pipe pressure and to open said brake cylinder exhaust to atmosphere upon sudden increase of train pipe pressure acting upon said means.

21. In a fluid pressure brake, the combination of a train pipe, a triple valve, a brake cylinder, an auxiliary reservoir, an engineer's valve provided with a feed valve for the running position and a pressure reducing valve for recharging the system at a pressure below that supplied in the running position, and means controlled by the engineer's rotary valve to direct air to the recharging pressure reducing valve and simultaneously to admit recharging air to the chamber above the equalizing piston, with a recharging brake holding valve device communicating with the train pipe, the auxiliary reservoir, and the brake cylinder exhaust, and provided with means operative by preponderating auxiliary air pressure to close the brake cylinder exhaust to atmosphere upon reduction of train pipe pressure and to open said brake cylinder exhaust to atmosphere upon a sudden increase of train pipe pressure acting upon said means, and having means to permit recharging of the auxiliary reservoir through said brake holding valve device.

22. In a fluid pressure brake, the combination of a train pipe, a triple valve, a brake cylinder, an auxiliary reservoir, an engineer's valve provided with a feed valve for the running position and a pressure reducing valve for recharging the system at a pressure below that supplied in the running position, the engineer's rotary valve having a passage to direct air to the recharging pressure reducing valve and a port to simultaneously admit air to the chamber above the equalizing piston, with a recharging brake holding device communicating with the train pipe, the auxiliary reservoir, and the brake cylinder exhaust, and provided with means operative by preponderating auxiliary air pressure to close the brake cylinder exhaust to atmosphere upon reduction of train pipe pressure and to open said brake cylinder exhaust to atmosphere upon a sudden increase of train pipe pressure acting upon said means, and having means to permit recharging of the auxiliary reservoir through said brake holding device, and arranged to prevent reduction of the auxiliary air pressure to the train pipe through said means upon reduction of train pipe pressure.

23. In a fluid pressure brake the combination of a train pipe, a triple valve, a brake cylinder, an auxiliary reservoir, an engineer's valve provided with a feed valve for the running position and a pressure reducing valve for recharging the system at a pressure below that supplied in the running position, said pressure reducing valve being provided with means to at will permit more or less air to flow at reduced pressure to the train pipe, and means controlled by the engineer's rotary valve to direct air to said recharging pressure reducing valve, with a recharging brake holding device communicating with the train pipe, the auxiliary reservoir, and the brake cylinder exhaust and provided with means operative by preponderating auxiliary air pressure to close the brake cylinder exhaust to atmosphere upon reduction of train pipe pressure and to open said brake cylinder exhaust upon a sudden increase of train pipe pressure acting upon said means, and having means to permit recharging of the auxiliary reservoir through said brake holding device.

24. In a fluid pressure brake the combination of a train pipe, a triple valve, a brake cylinder, an auxiliary reservoir, an engineer's valve provided with a feed valve for the running position and a pressure reducing valve for recharging the system at a pressure below that supplied in the running position, said pressure reducing valve being provided with a plug having means to vary the volume of fluid flowing from said valve to the train pipe, and means controlled by the engineer's rotary valve to direct air to the recharging pressure reducing valve while other ports and passages for the train pipe are blanked, with a recharging brake holding device communicating with the train pipe, the auxiliary reservoir, and the brake cylinder exhaust, and provided with means operative by preponderating auxiliary air pressure to close the brake cylinder exhaust to atmosphere upon reduction of train pipe pressure and to open said brake cylinder exhaust to atmosphere upon a sudden increase of train pipe pressure acting upon said means, and having means to permit recharging of the auxiliary reservoir through said brake holding valve device.

25. In a fluid pressure brake the combination of a train pipe, a triple valve, a brake cylinder, an auxiliary reservoir, an engineer's valve provided with a feed valve for the running position and a pressure reducing valve for recharging the system at a pressure below that supplied in the running position, said pressure reducing valve being provided with a plug having ports of varying size to control the volume of fluid flowing from said valve to the train pipe, and means controlled by the engineer's rotary valve to direct air to the recharging pressure reducing valve, with a recharging brake holding device communicating with the train pipe, the auxiliary reservoir, and the brake cylinder exhaust, and provided with means operative by preponderating auxiliary air pressure to close the brake cylinder exhaust to atmosphere upon reduction of train pipe pressure and to open said brake cylinder exhaust to atmosphere upon a sudden increase of train pipe pressure acting upon said means, and having means to permit recharging of the auxiliary reservoir through said brake holding valve device.

26. In a fluid pressure brake, the combination of a train pipe, an engineer's valve provided with a feed valve, and a recharging valve to deliver air to the train pipe at a pressure less than the pressure delivered by the feed valve in the running position, a triple valve, an auxiliary reservoir, and a brake cylinder, with means to control the brake cylinder exhaust and under the influence of auxiliary air and train pipe air, and arranged to be operated by auxiliary air pressure upon reduction of train pipe pressure to prevent the escape of brake cylinder exhaust and to remain in such position during recharging of the system irrespective of the pressures during recharging in the train pipe and in the auxiliary reservoir, and adapted to move to open the brake cylinder exhaust upon sudden increase of train pipe pressure acting upon said means irrespective of auxiliary air pressure.

27. In a fluid pressure brake mechanism, the combination of a train pipe, an engineer's valve, and the necessary operative parts of said brake mechanism, said engineer's valve being provided with a feed valve for the running position, and a pressure reducing valve for recharging the system at a pressure below that supplied in the running position, the engineer's rotary valve having means to supply air to the feed valve in the running position, means to supply air to the recharging valve when in another position, and means to admit air to the chamber above the equalizing piston during recharging of the train pipe.

28. In a fluid pressure brake mechanism, the combination of a train pipe, an engineer's valve, and the necessary operative parts of said brake mechanism, said engineer's valve being provided with a feed valve for the running position, and a pressure reducing valve for recharging the system at a pressure below that supplied in the running position, the last named valve having a passage communicating with the passage that conducts air to the feed valve, the engineer's rotary valve having means to supply air to the feed valve in the running position, means to supply air to the recharging valve when in another position, and arranged to supply recharging air to the chamber above the equalizing piston while the rotary valve supplies recharging air to the train pipe.

29. In a fluid pressure brake mechanism, the combination of a train pipe, an engineer's valve and the operative necessary parts of said brake mechanism, said engineer's valve being provided with a feed valve having a passage communicating with the rotary valve seat, and a passage communicating with the train pipe, a recharging pressure reducing valve having a passage communicating with the valve seat and a passage communicating with the first named passage for supplying recharging air through the first named feed valve to the train pipe, an equalizing piston, a passage connecting the chamber above said piston with said valve seat, and a rotary valve having a passage for delivering air for the running position, a passage for delivering air in the recharging position, and a port to deliver recharging air to the chamber above the piston in the recharging position of the rotary valve.

JOHN H. BLEOO.

Witnesses:
T. F. BOURNE,
MARIE F. WAINWRIGHT.